(12) United States Patent
Hou et al.

(10) Patent No.: US 10,263,925 B2
(45) Date of Patent: Apr. 16, 2019

(54) METHOD, DEVICE AND MEDIUM FOR SENDING MESSAGE

(71) Applicant: Beijing Xiaomi Mobile Software Co., Ltd., Haidian District, Beijing (CN)

(72) Inventors: Enxing Hou, Beijing (CN); Yi Ding, Beijing (CN); Benchang Su, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 301 days.

(21) Appl. No.: 15/347,793

(22) Filed: Nov. 10, 2016

(65) Prior Publication Data

US 2017/0201477 A1 Jul. 13, 2017

(30) Foreign Application Priority Data

Jan. 8, 2016 (CN) .......................... 2016 1 0012033

(51) Int. Cl.
  *G06Q 50/00* (2012.01)
  *H04L 12/58* (2006.01)
  *H04L 29/08* (2006.01)

(52) U.S. Cl.
  CPC ........... *H04L 51/046* (2013.01); *G06Q 50/01* (2013.01); *H04L 51/32* (2013.01); *H04L 67/18* (2013.01); *H04L 67/306* (2013.01)

(58) Field of Classification Search
  CPC ..... H04L 51/046; H04L 67/306; H04L 67/18; H04L 51/32; G06Q 50/01
  See application file for complete search history.

(56) References Cited

U.S. PATENT DOCUMENTS

| 8,010,602 B2 | 8/2011 | Shen et al. |
| 2007/0271328 A1* | 11/2007 | Geelen ................... G01C 21/26 709/201 |
| 2012/0273565 A1 | 11/2012 | Lin et al. |

(Continued)

FOREIGN PATENT DOCUMENTS

| CN | 101079790 A | 11/2007 |
| CN | 102510551 A | 6/2012 |

(Continued)

OTHER PUBLICATIONS

Extended European Search Report of EP16206783.9.
International Search Report of PCT/CN2016/096657.

*Primary Examiner* — Michael A Keller
(74) *Attorney, Agent, or Firm* — Jun He Law Office P.C.; James J. Zhu

(57) ABSTRACT

A method, a device and a medium for sending message are provided. The method includes: determining whether opposite terminal communication information of an opposite terminal user is acquired; generating a first friend-adding prompt according to the opposite terminal communication information if the opposite terminal communication information is acquired; sending local terminal communication information to the opposite terminal to enable the opposite terminal to generate a second friend-adding prompt according to the local terminal communication information, the second friend-adding prompt being used to prompt the opposite terminal user to add the local terminal user as a friend.

11 Claims, 9 Drawing Sheets

(56) References Cited

U.S. PATENT DOCUMENTS

| | | | | |
|---|---|---|---|---|
| 2015/0215421 A1* | 7/2015 | Wei | ......................... | H04W 4/21 |
| | | | | 709/204 |
| 2015/0304266 A1* | 10/2015 | Ling | ....................... | H04L 51/32 |
| | | | | 709/206 |
| 2015/0373498 A1* | 12/2015 | Chizi | .................... | H04W 4/027 |
| | | | | 455/456.3 |

FOREIGN PATENT DOCUMENTS

| | | | |
|---|---|---|---|
| CN | 103078830 | A | 5/2013 |
| CN | 103117914 | A | 5/2013 |
| CN | 103188131 | A | 7/2013 |
| CN | 105704214 | A | 6/2016 |

* cited by examiner

METHOD, DEVICE AND MEDIUM FOR SENDING MESSAGE

CROSS REFERENCE TO RELATED APPLICATION

This application is based on and claims priority to Chinese Patent Application No. 201610012033.7 filed on Jan. 8, 2016, which is incorporated herein by reference in its entirety.

FIELD

The present disclosure generally relates to the field of information processing technology, and more particularly to a method, a device and a medium for sending message.

BACKGROUND

Typically, when a user add a friend by communication application programs, it is always through scanning a two-dimension code of the friend's communication application programs, or searching a communication account of the friend's communication application programs to send a friend request. However, the friend-adding may not be completed if the user forgets to add after the two-dimension code or communication account of the friend's communication application programs is acquired.

SUMMARY

A method, a device and a medium for sending message are provided in the present disclosure.

In accordance with the first aspect of the embodiments of the present disclosure, a method for sending message is provided. The method includes: determining whether opposite terminal communication information of an opposite terminal user is acquired; generating a first friend-adding prompt according to the opposite terminal communication information if the opposite terminal communication information is acquired, the first friend-adding prompt being used to prompt a local terminal user to add the opposite terminal user as a friend; and sending local terminal communication information to the opposite terminal to enable the opposite terminal to generate a second friend-adding prompt according to the local terminal communication information, the second friend-adding prompt being used to prompt the opposite terminal user to add the local terminal user as a friend.

In accordance with the second aspect of the embodiments of the present disclosure, a device for sending message is provided. The device includes: a processor; a memory for storing processor-executable instructions; wherein the processor is configured to: determine whether opposite terminal communication information of an opposite terminal user is acquired; generate a first friend-adding prompt according to the opposite terminal communication information if the opposite terminal communication information is acquired, the first friend-adding prompt being used to prompt the local terminal user to add the opposite terminal user as a friend; and send local terminal communication information to the opposite terminal to enable the opposite terminal to generate a second friend-adding prompt according to the local terminal communication information, the second friend-adding prompt being used to prompt the opposite terminal user to add the local terminal user as a friend.

In accordance with the third aspect of the embodiments of the present disclosure, a non-transitory computer-readable storage medium having stored therein instructions that, when executed by a processor of a device, causes the device to perform a method for sending message, the method including: determining whether opposite terminal communication information of an opposite terminal user is acquired; generating a first friend-adding prompt according to the opposite terminal communication information if the opposite terminal communication information is acquired, the first friend-adding prompt being used to prompt a local terminal user to add the opposite terminal user as a friend; and sending local terminal communication information to the opposite terminal to enable the opposite terminal to generate a second friend-adding prompt according to the local terminal communication information, the second friend-adding prompt being used to prompt the opposite terminal user to add the local terminal user as a friend.

It is to be understood that the forgoing general description and the following detailed description are illustrative and explanatory only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Exemplary embodiments will now be illustrated in detail, examples of which are illustrated in the accompanying drawings. When the following description refers to the accompanying drawings, the same numbers in different drawings represent the same or similar elements, unless otherwise described. The implementations described in the following exemplary embodiments do not represent all of the implementations consistent with the present disclosure. Instead, they are merely examples of devices and methods consistent with aspects of the present disclosure as recited in the appended claims.

Figure 1:
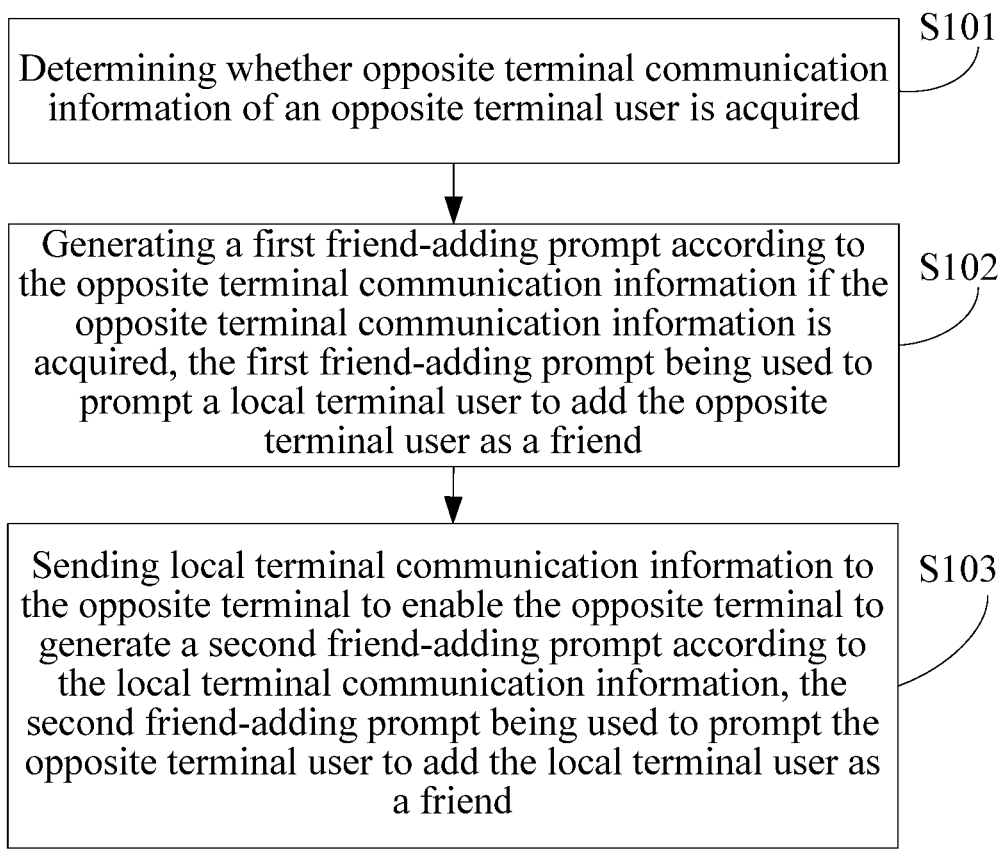
FIG. 1 is a flow chart illustrating a method for sending message according to an exemplary embodiment.

A method for sending message is provided in the disclosure. The method may be used in message sending programs, systems or devices, and may be applied to terminals carried by users. As illustrated in FIG. 1, the method may include step S101 to step S103.

In step S101, whether the opposite terminal communication information of the opposite terminal is acquired may be determined, and the opposite terminal communication information may be used to uniquely identify the opposite terminal. The opposite terminal communication information may be at least one of the following information: a communication account of the opposite terminal, a two-dimensional code identification corresponding to the communication account of the opposite terminal user, a bar code identification corresponding to the communication account of the opposite terminal user, and the communication account may be an account of some communication application program used by the opposite terminal user.

In step S102, a first friend-adding prompt may be generated according to the opposite terminal communication information if the opposite terminal communication information is acquired, and the first friend-adding prompt may be used to prompt the local terminal user to add the opposite terminal user as a friend.

The first friend-adding prompt may be generated automatically if the opposite terminal communication information of the opposite terminal user is acquired. The first friend-adding prompt may be either a virtual option button, or ordinary prompt message (e.g., text, image and the like), which may be used to send the opposite terminal a friend-adding request for adding the opposite terminal user as a friend when the friend-adding operation is received from the local terminal user.

The friend-adding operation may be clicking the first friend-adding prompt for M1 times, sliding a preset friend-adding track such as track "A" (wherein A is the initial letter of Ask) in the first friend-adding prompt interface, triggering a "add" option in the virtual option button if the first friend-adding prompt is a virtual option button, etc.

In step S103, the local terminal communication information may be sent to the opposite terminal to enable the opposite terminal to generate a second friend-adding prompt according to the local terminal communication information, and the second friend-adding prompt may be used to prompt the opposite terminal user to add the local terminal user as a friend.

When the opposite terminal communication information of an opposite terminal user is acquired by the local terminal, and local terminal communication information may be sent to the opposite terminal. Thus, the opposite terminal may also have the local terminal communication information of the local terminal user, and then the second friend-adding prompt may be generated according to the local terminal communication information. In this way, either the local terminal or the opposite terminal may actively add each other as a friend, so as to avoid that the both sides cannot be friends if the local terminal user forgets to add the opposite terminal user as a friend after the opposite terminal communication information of the opposite terminal user is acquired.

The second friend-adding prompt may be either a virtual option button, or ordinary prompt message (e.g., text, image and the like), which may be used to send to the local terminal a friend-adding request for adding the local terminal user as a friend when the friend-adding operation is received from the opposite terminal user. The frined-adding operation may be clicking the second friend-adding prompt for N1 times, sliding a preset adding track such as track "T" (wherein T is the initial letter of the Chinese alphabet "Tian") in the second friend-adding prompt interface, triggering a "add" option in the virtual option button if the second friend-adding prompt is a virtual option button (such as an add button), etc.

In one embodiment, the opposite terminal communication information may include at least one of the following information: a communication account of the opposite terminal user, a two-dimensional code identification corresponding to the communication account of the opposite terminal user, a bar code identification corresponding to the communication account of the opposite terminal user.

The local terminal communication information may include at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

The local terminal communication information may include the information such as a communication account which may uniquely identify the local terminal user, a two-dimensional code identification corresponding to the communication account of the local terminal user, a bar code identification corresponding to the communication account of the local terminal user, etc. The opposite terminal may generate the second friend-adding prompt automatically according to these information, so as to add the local terminal as a friend according to the second friend-adding prompt. Moreover, the local terminal communication information may also include other information, thus the opposite terminal user may know the identity of the local terminal user in detail, so as to help the opposite terminal user to make a right decision about whether to add the local terminal user as a friend or agree to add the local terminal user as a friend, which may avoid that the opposite terminal user adds or agrees to add the local terminal user as a friend blindly.

Figure 2A:
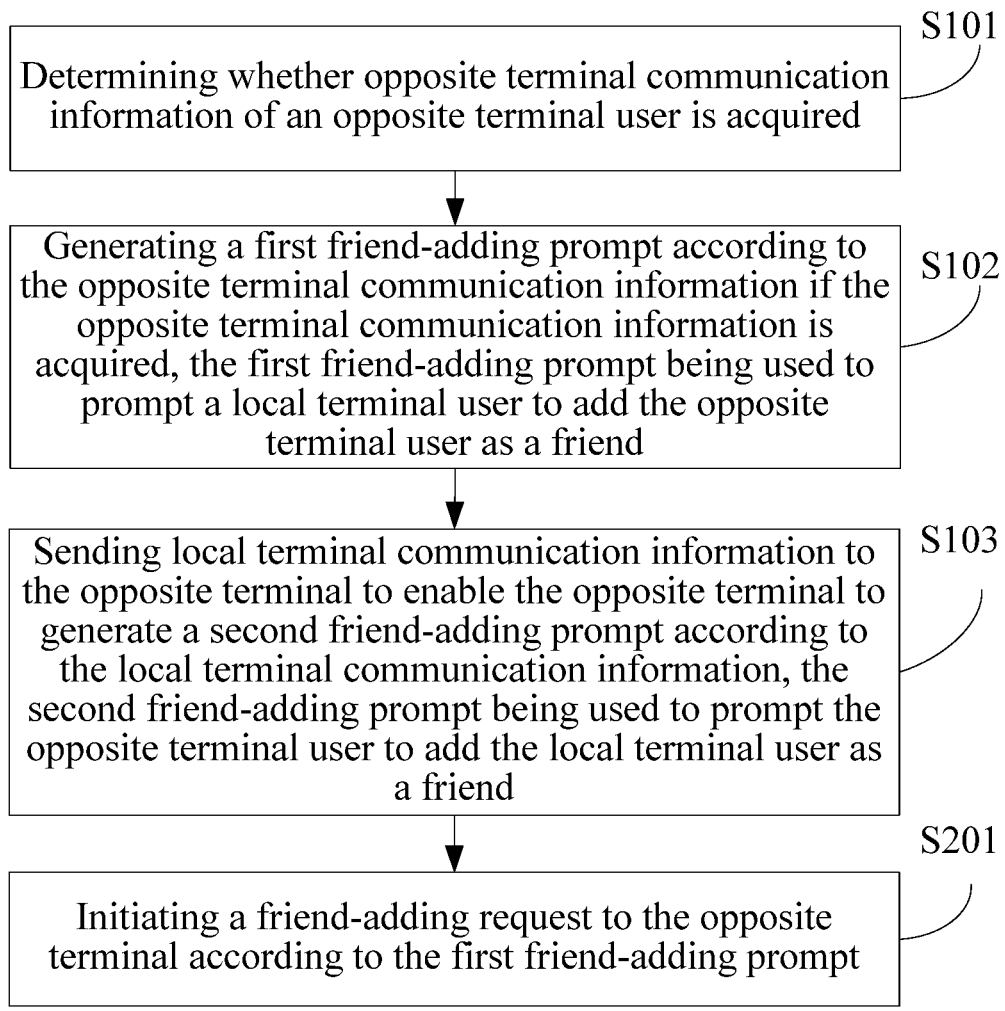
FIG. 2A is a flow chart illustrating another method for sending message according to an exemplary embodiment.

As illustrated in FIG. 2A, in one embodiment, the method may further include: Step S201, a friend-adding request may be sent to the opposite terminal according to the first friend-adding prompt.

Figure 2B:
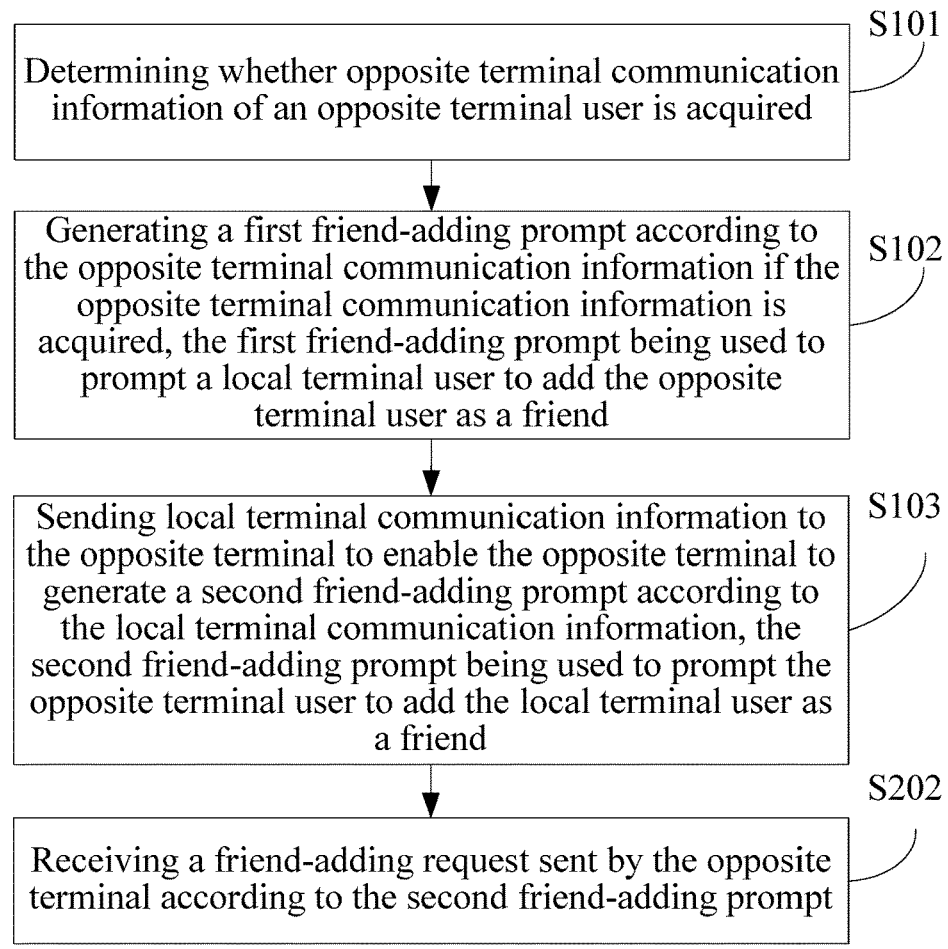
FIG. 2B is a flow chart illustrating another method for sending message according to an exemplary embodiment.

Alternatively, as illustrated in FIG. 2B, in one embodiment, the method may further include: Step S202, a friend-adding request sent by the opposite terminal according to the second friend-adding prompt may be received.

After the first friend-adding prompt and the second friend-adding prompt are generated, the local terminal may trigger the first friend-adding prompt to send a friend-adding request to the opposite terminal actively, so as to request adding the opposite terminal user as a friend actively. Alternatively, a friend-adding request sent actively by the opposite terminal according to the second friend-adding prompt may be received.

In one embodiment, the foregoing method may further include establishing a communication connection with the opposite terminal, and sending a prompt message that allows communication to the opposite terminal, if a friend confirmation instruction for the friend-adding request is monitored.

Whether the local terminal sends the friend confirmation instruction to the opposite terminal actively in response to the friend-adding request sent by the opposite terminal, or the opposite terminal send the friend confirmation instruction to the local terminal in response to the friend-adding request sent by the local terminal, once the friend confirmation instruction is monitored, it may indicate that the local terminal user and the opposite terminal user agree to add each other as a friend. Thus a communication connection with the opposite terminal may be established automatically to enable the both sides to communicate. At the same time, the prompt message that allows communication may be sent to the opposite terminal to inform the opposite terminal user that the communication is available, so as to communicate with the local terminal user in time.

Furthermore, the prompt message that allows communication may be sent to the opposite terminal in a number of ways, for example, establishing a communication window of the both sides directly and displaying the prompt message in the form of text in the communication window, or displaying the prompt message in the form of voice or image directly, or sending the prompt message in the form of notification to the system notification bar of the opposite terminal.

In one embodiment, the foregoing method may further include generating a friend-adding rejection prompt message and deleting the acquired opposite terminal communication information, if it is monitored that the opposite terminal, according to the second friend-adding prompt, rejects a friend-adding request initiated by the local terminal.

If it is monitored that the opposite terminal, according to the second friend-adding prompt, rejects a friend-adding request initiated by the local terminal (i.e., a friend rejection instruction sent by the opposite terminal for the friend-adding request initiated by the local terminal is received), which may indicate that the opposite terminal does not agree the friend-adding request of the local terminal, then a friend-adding rejection prompt message may be generated automatically to prompt the local terminal user that the opposite terminal user refuses to add the local terminal user as a friend. At the same time, the opposite terminal communication information previously acquired by the local terminal may be deleted automatically to prevent that the local terminal re-send a friend-adding request to the opposite terminal according to the opposite terminal communication information and the first friend-adding prompt, which may harass the opposite terminal user.

Wherein the opposite terminal may, according to the second friend-adding prompt, reject the friend-adding request initiated by the local terminal in a number of ways, for example, clicking the second friend-adding prompt for N2 times, sliding a preset reject adding track such as track "R" (wherein R is the initial of Refuse) in the second friend-adding prompt interface, triggering a "refuse" option in the virtual option button if the second friend-adding prompt is a virtual option button (such as an add button), etc.

Furthermore, the local terminal may also, according to the first friend-adding prompt, employ the foregoing ways to reject the friend-adding request sent by the opposite terminal, for example, clicking the first friend-adding prompt for M2 times, sliding a preset reject adding track such as track "R" (wherein R is the initial of Refuse) in the second friend-adding prompt interface, triggering a "refuse" option in the virtual option button if the first friend-adding prompt is a virtual option button, etc. Moreover, all the values of M1, M2, N1, N2 may be different.

Figure 3A:
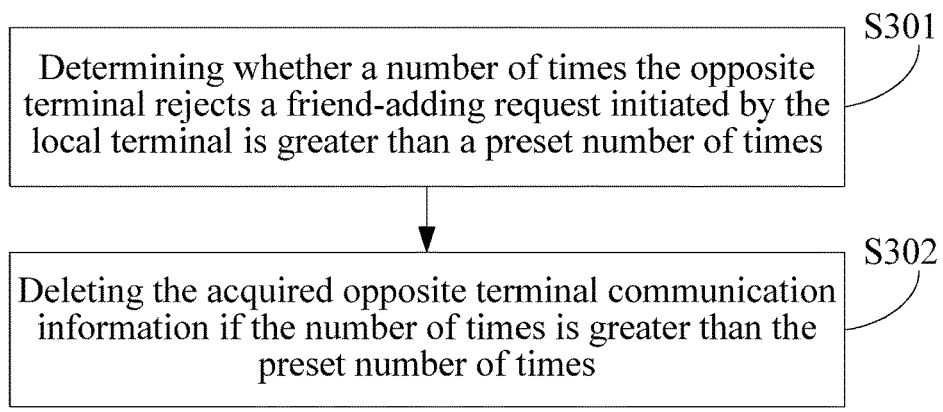
FIG. 3A is a flow chart illustrating another method for sending message according to an exemplary embodiment.

As illustrated in FIG. 3A, in one embodiment, deleting the acquired opposite terminal communication information may include following steps.

In step S301, it may be determined that whether a number of times the opposite terminal rejects a friend-adding request initiated by the local terminal is greater than a preset number of times.

In step S302, the acquired opposite terminal communication information may be deleted if the number of times is greater than the preset number of times;

In order to prevent that the opposite terminal communication information acquired by the local terminal may be deleted mistakenly, which may bring unnecessary trouble and inconvenience to the local terminal, before the opposite terminal communication information acquired by the local terminal is deleted, the number of times the opposite terminal rejects a friend-adding request of the local terminal may also be determined carefully, so as to determine that whether the local terminal has harassed the opposite terminal according to the number of times. Specifically, if the number of times is greater than a preset number of times (e.g., 5 times), it may indicate that the opposite terminal is unwilling to add the local terminal as a friend and the local terminal has harassed the opposite terminal. Then the opposite terminal communication information acquired by the local terminal may be deleted automatically, such that the local terminal may not be able to initiate a friend-adding request to the opposite terminal conveniently and quickly according to the first friend-adding prompt, which may harass the opposite terminal.

Figure 3B:
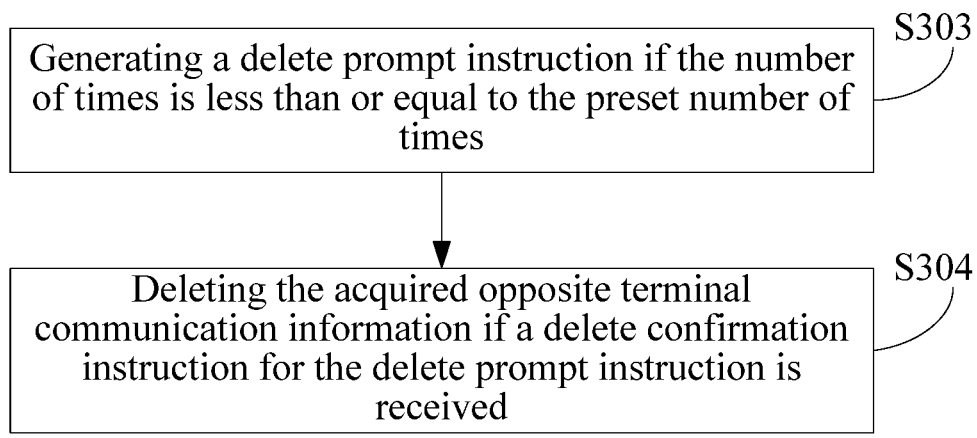
FIG. 3B is a flow chart illustrating another method for sending message according to an exemplary embodiment.

Alternatively, as illustrated in FIG. 3B, in one embodiment, deleting the acquired opposite terminal communication terminal may include following steps.

In step S303, a delete prompt instruction may be generated if the number of times is less than or equal to the preset number of times.

In step S304, the acquired opposite terminal communication information may be deleted when a delete confirmation instruction for the delete prompt instruction is received.

If the number of times is less than or equal to the preset number of times, it cannot be determined that the local terminal does not harass the opposite terminal, a delete prompt instruction may be generated automatically to avoid misoperations, such that the local terminal user may determine at its discretion whether to delete the acquired opposite terminal communication information.

If the delete confirmation instruction is received, it may indicate that the local terminal user agrees to delete the acquired opposite terminal communication information, then the opposite terminal communication information acquired by the local terminal may be deleted, so as to the local terminal may not be able to initiate a friend-adding request to the opposite terminal conveniently and quickly, which may harass the opposite terminal.

Figure 4:
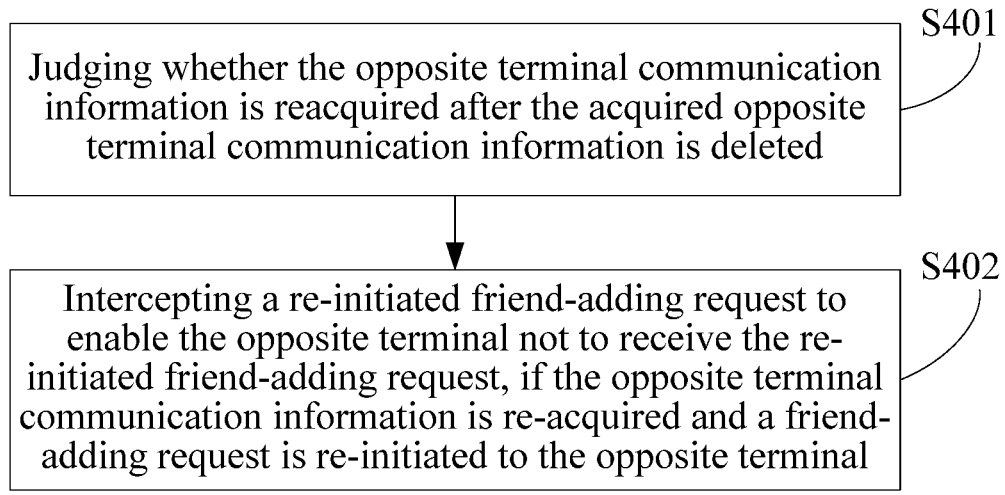
FIG. 4 is a flow chart illustrating another method for sending message according to an exemplary embodiment.

As illustrated in FIG. 4, in one embodiment, the method may further include following steps.

In step S401, it may be judged whether the opposite terminal communication information is reacquired after the acquired opposite terminal communication information is deleted.

In step S402, a re-initiated friend-adding request may be intercepted to enable the opposite terminal not to receive the re-initiated friend-adding request, when the opposite terminal communication information is reacquired and a friend-adding request is re-initiated to the opposite terminal.

As deleting the opposite terminal communication information acquired by the local terminal may mean that the opposite terminal is unwilling to add the local terminal as a friend and the local terminal has harassed the opposite terminal. As a result, if it is monitored that the local terminal reacquires the opposite terminal communication information and the local terminal re-initiates a friend-adding request to the opposite terminal, then the friend-adding request may be intercepted automatically to prevent that the opposite terminal receives the friend-adding request and that the local terminal continuously sends harassing requests to the opposite terminal, thus the user experience of the opposite terminal may be improved.

Of course, to avoid mistaken interception when intercepting the friend-adding request, the user may confirm whether to intercept or not.

Figure 5:
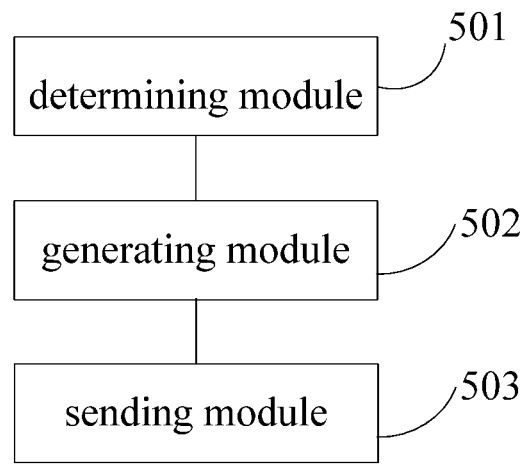
FIG. 5 is a block diagram illustrating a device for sending message according to an exemplary embodiment.

Corresponding to the foregoing method for sending message provided by embodiments of the present disclosure, a device for sending message is also provided in embodiments of the present disclosure. As illustrated in FIG. 5, the device may include: a determining module 501 configured to determine whether opposite terminal communication information of an opposite terminal user is acquired; a generating module 502 configured to generate a first friend-adding prompt according to the opposite terminal communication information if the opposite terminal communication information is acquired, the first friend-adding prompt may be used to prompt a local terminal user to add an opposite terminal user as a friend; and a sending module 503 configured to send local terminal communication information to the opposite terminal to enable the opposite terminal to generate a second friend-adding prompt according to the local terminal communication information, the second friend-adding prompt may be used to prompt the opposite terminal user to add the local terminal user as a friend;

In one embodiment, the opposite terminal communication information may include at least one of the following information: a communication account of the opposite terminal user, a two-dimensional code identification corresponding to the communication account of the opposite terminal user, a bar code identification corresponding to the communication account of the opposite terminal user.

The local terminal communication information may include at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

Figure 6A:
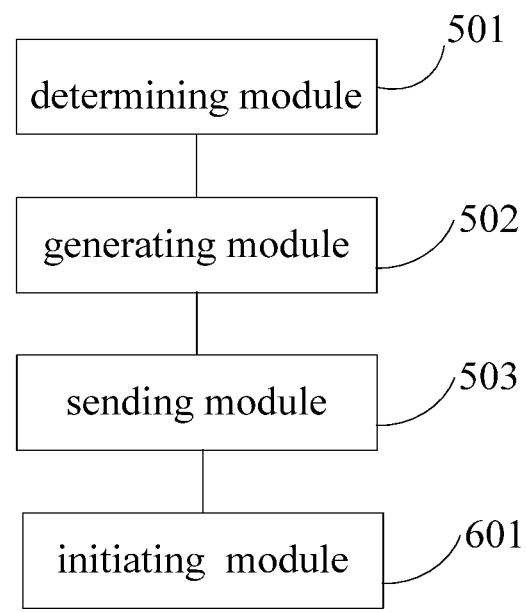
FIG. 6A is a block diagram illustrating another device for sending message according to an exemplary embodiment.

As illustrated in FIG. 6A, in one embodiment, the device may further include an initializing module 601 configured to initiate a friend-adding request to the opposite terminal according to the first friend-adding prompt.

Figure 6B:
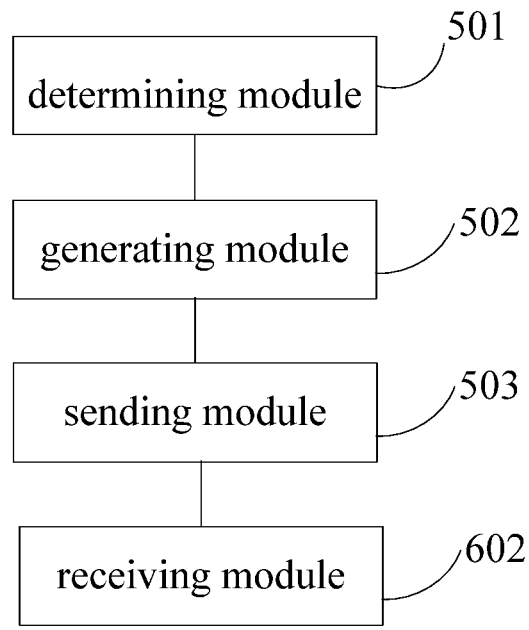
FIG. 6B is a block diagram illustrating another device for sending message according to an exemplary embodiment.

Alternatively, as illustrated in FIG. 6B, in one embodiment, the device may further include a receiving module 602 configured to receive a friend-adding request sent by the opposite terminal according to the second friend-adding prompt.

Figure 7A:
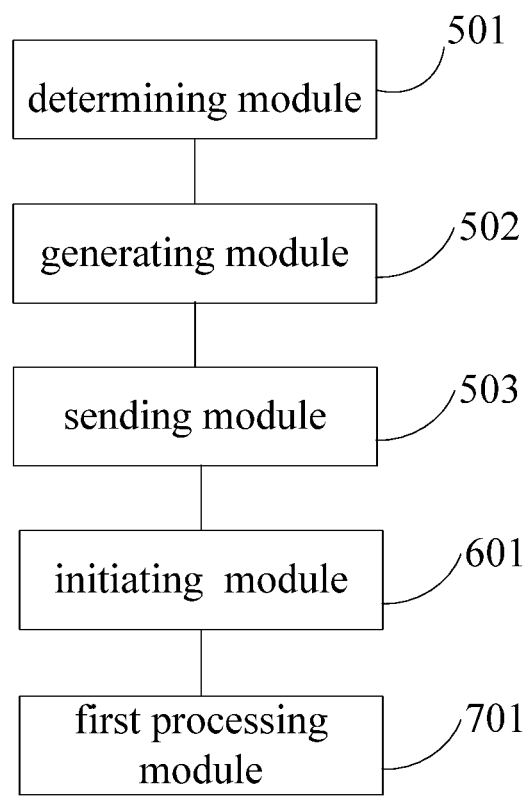
FIG. 7A is a block diagram illustrating another device for sending message according to an exemplary embodiment.

As illustrated in FIG. 7A, in one embodiment, the device may further include a first processing module 701 configured to establish a communication connection with the opposite terminal, and send a prompt message that allows communication to the opposite terminal, if a friend confirmation instruction for the friend-adding request is monitored.

Figure 7B:
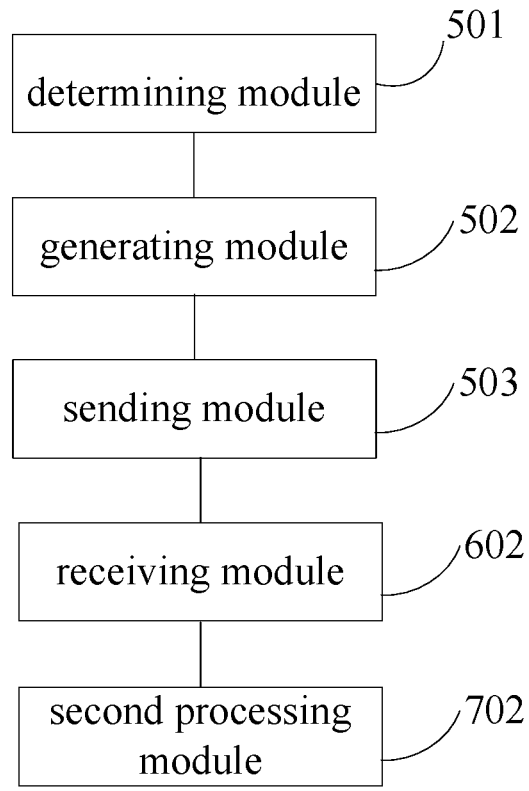
FIG. 7B is a block diagram illustrating another device for sending message according to an exemplary embodiment.

As illustrated in FIG. 7B, in one embodiment, the device may further include a second processing module 702 configured to generate a friend-adding rejection prompt message, and delete the acquired opposite terminal communication information, if it is monitored that the opposite terminal, according to the second friend-adding prompt, rejects a friend-adding request initiated by the local terminal.

Figure 8A:
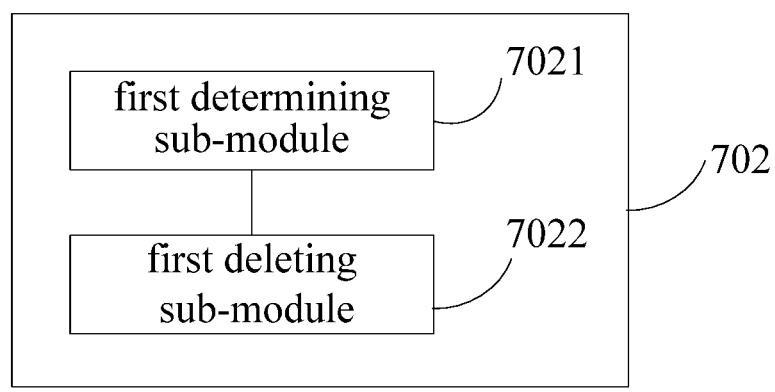
FIG. 8A is a block diagram illustrating another device for sending message according to an exemplary embodiment.

As illustrated in FIG. 8A, in one embodiment, the second processing module 702 may include: a first determining sub-module 7021 configured to determine whether a number of times the opposite terminal rejects a friend-adding request initiated by the local terminal is greater than a preset number of times; and a first deleting sub-module 7022 configure to delete the acquired opposite terminal communication information if the number of times is greater than the preset number of times.

Figure 8B:
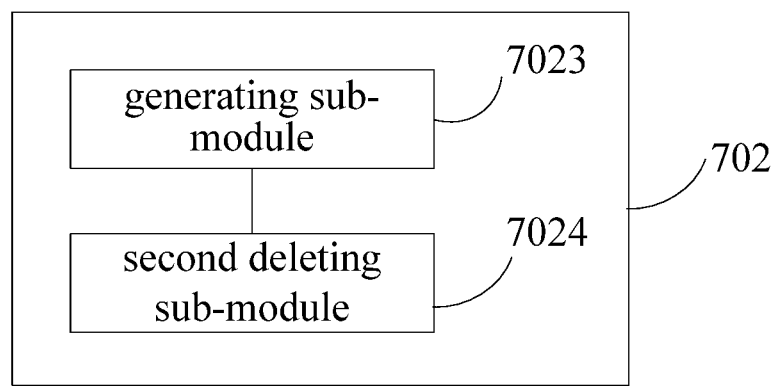
FIG. 8B is a block diagram illustrating another device for sending message according to an exemplary embodiment.

Alternatively, as illustrated in FIG. 8B, in one embodiment, the second processing module 702 may include: a generating sub-module 7023 configured to generate a delete prompt instruction if the number of times is less than or equal to the preset number of times; and a second deleting sub-module 7024 may be configured to delete the acquired opposite communication information if a delete confirmation instruction for the delete prompt instruction is received.

Figure 9:
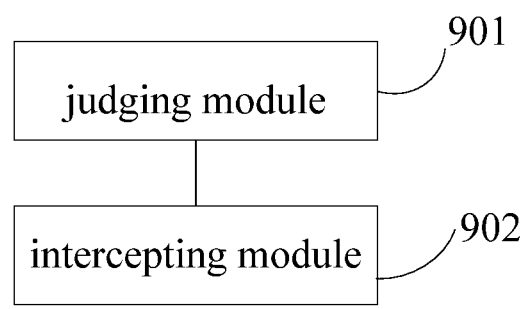
FIG. 9 is a block diagram illustrating another device for sending message according to an exemplary embodiment.

As illustrated in FIG. 9, in one embodiment, the device may further include: a judging module 901 configured to judge whether the opposite terminal communication information is reacquired after the acquired opposite terminal communication information is deleted; and an intercepting module 902 configured to intercept a re-initiated friend-adding request to enable the opposite terminal not to receive the re-initiated friend-adding request, if the opposite terminal communication information is reacquired and a friend-adding request is re-initiated to the opposite terminal.

In accordance with the third aspect of the embodiments of the present disclosure, a device for sending message is provided. The device includes a processor and a memory for storing processor-executable instructions. The processor may be configured to: determine whether opposite terminal communication information of an opposite terminal user is acquired; generate a first friend-adding prompt according to the opposite terminal communication information if the opposite terminal communication information is acquired, the first friend-adding prompt being used to prompt the local terminal user to add the opposite terminal user as a friend; and send local terminal communication information to the opposite terminal to enable the opposite terminal to generate a second friend-adding prompt according to the local terminal communication information, the second friend-adding prompt being used to prompt the opposite terminal user to add the local terminal user as a friend.

The opposite terminal communication information may include at least one of the following information: a communication account of the opposite terminal user, a two-dimensional code identification corresponding to the communication account of the opposite terminal user, a bar code identification corresponding to the communication account of the opposite terminal user.

The local terminal communication information may include at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

The foregoing processor may also configured to initiate a friend-adding request to the opposite terminal according to the first friend-adding prompt; or receive a friend-adding request sent by the opposite terminal according to the second friend-adding prompt.

The foregoing processor may also configured to establish a communication connection with the opposite terminal, and send a prompt message that allows communication to the opposite terminal, if a friend confirmation instruction for the friend-adding request is monitored.

The foregoing processor may also configured to generate a friend-adding rejection prompt message and delete the acquired opposite terminal communication information, if it is monitored that the opposite terminal, according to the second friend-adding prompt, rejects a friend-adding request initiated by the local terminal.

The foregoing processor may also configured to determine whether a number of times the opposite terminal rejects a friend-adding request initiated by the local terminal is greater than a preset number of times; delete the acquired opposite terminal communication information if the number of times is greater than the preset number of times; or generate a delete prompt instruction if the number of times is less than or equal to the preset number of times; delete the acquired opposite terminal communication information if a delete confirmation instruction for the delete prompt instruction is received.

The foregoing processor may also configured to judge whether the opposite terminal communication information is reacquired after the acquired opposite terminal communication information is deleted; and intercept a re-initiated friend-adding request to enable the opposite terminal not to receive the re-initiated friend-adding request, if the opposite terminal communication information is reacquired and a friend-adding request is re-initiated to the opposite terminal.

Figure 10:
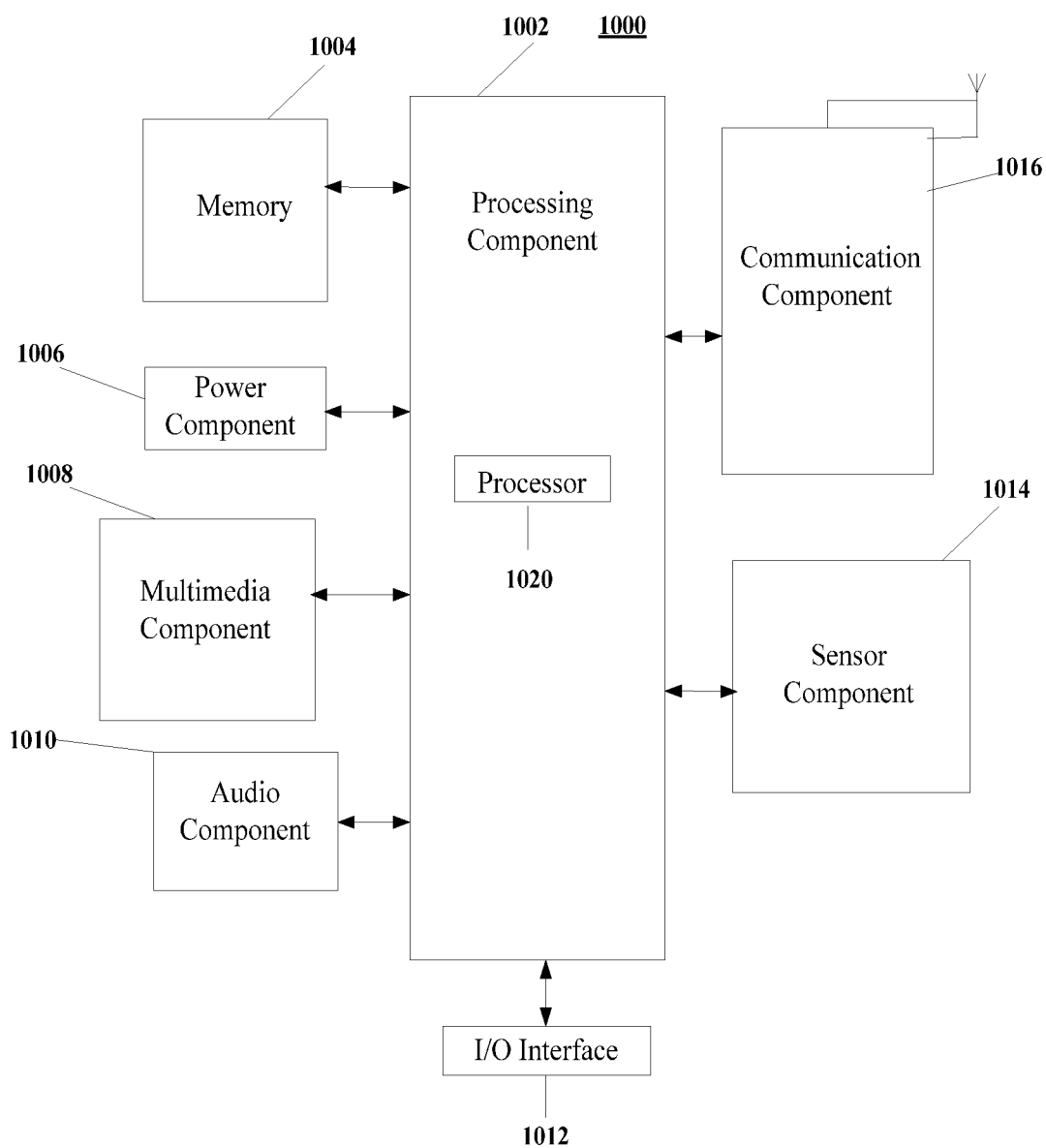
FIG. 10 is a block diagram illustrating a device applicable to sending message according to an exemplary embodiment.

FIG. 10 is a block diagram illustrating a device 1000 for sending message according to an example embodiment, which may be applicable to terminal devices. For example, the device 100 may be mobile phone, computer, digital broadcast terminal, messaging device, game console, tablet device, medical device, fitness equipment, personal digital assistant, etc.

Referring to FIG. 10, the device 1000 may comprise one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operation of the device 1000, such as the operations associated with display, telephone call, data communications, camera operations and recording operations. The processing element 1002 may comprise one or more processors 1020 to execute instructions to perform all or part of the steps in the above described methods. Additionally, the processing component 1002 may comprise one or more modules which facilitate the interaction between the processing component 1002 and other components. For instance, the processing component 1002 may comprise multimedia module to facilitate the interaction between the multimedia component 1008 and the processing component 1002.

The memory 1004 is configured to store various types of data to support the operation of the device 1000. Examples of such data comprise instructions for any applications or methods operated on the device 1000, contacts data, phonebook data, messages, images, videos, etc. The memory 1004 may be implemented using any type of volatile or non-volatile memory devices or a combination thereof, such as a static random access memory (SRAM), an electrically erasable programmable read only memory (EEPROM), an erasable programmable read only memory (EPROM), a programmable read-only memory (PROM), a read-only memory (ROM), a magnetic memory, a flash memory, a magnetic disk or optical disk.

The power component 1006 provides power to various components of the device 1000. The power component 1006 may comprise a power management system, one or more power sources, and any other components associated with the generation, management, and distribution of power in the device 1000

The multimedia component 1008 comprises a screen providing an output interface between the device 1000 and the user. In some embodiments, the screen may comprise a liquid crystal display (LCD) and a touch panel (TP). If the screen comprises the touch panel, the screen may be implemented as a touch screen to receive input signal from the users. The touch panel comprises one or more touch sensors to sense touches, swipes and gestures on the touch panel. The touch sensor may not only sense a boundary of a touch or swipe action, but also detect the duration and pressure associated with the touch or swipe operation. In some embodiments, the multimedia component 1008 comprises one front camera and/or rear camera. When the device 1000 is in an operation mode, such as a shooting mode or a video mode, the front camera and/or rear camera may receive external multimedia data. Each front camera and rear camera may be a fixed optical lens system or have focal length and optical zoom capability.

The audio component 1010 is configured to output and/or input audio signals. For example, the audio component 1010 comprises a microphone (MIC) configured to receive an external audio signal when the device 1000 is in an operation mode, such as a call mode, a recording mode and a voice recognition mode. The received audio signal may be further stored in the memory 1004 or transmitted via the communication component 1016. In some embodiments, the audio component 1010 further comprises a speaker to output audio signals.

The I/O interface 1012 provides an interface between the processing component 1002 and peripheral interface modules, such as a keyboard, a click wheel, buttons, and the like. The buttons may comprise, but are not limited to: a home button, a volume button, a starting button, and a locking button.

The sensor component 1014 comprises one or more sensors to provide various aspects of status assessments for the device 1000. For instance, the sensor component 1014 may detect an open/closed status of the device 1000, relative positioning of components, such as the display and the keypad of the device 1000, the sensor component 1014 may also detect a position change of the device 1000 or a component thereof, a presence or absence of a contact between the user and the device 1000, an orientation or acceleration/deceleration of the device 1000, and a temperature change of the device 1000. The sensor component 1014 may comprise a proximity sensor configured to detect the presence of nearby objects without any physical contact. The sensor component 1014 may further comprise a light sensor, such as a CMOS or CCD image sensor, for use in imaging applications. In some embodiments, the sensor component 1014 may further comprise an accelerometer sensor, a gyroscope sensor, a magnetic sensor, a pressure sensor, a microwave sensor, or a temperature sensor.

The communication component 1016 is configured to facilitate the device 1000 to communication, wired or wirelessly, with other devices. The device 1000 can access a communication standard based wireless network, such as WiFi, 2G or 3G, or a combination thereof. In one exemplary embodiment, the communication component 1016 receives a broadcast signal from an external broadcast management system or broadcasts the associated information via a broadcast channel. In one exemplary embodiment, the communication component 1016 further comprises a near field communication (NFC) module to facilitate short-range communication. For example, the NFC module may be implemented based on radio frequency identification (RFID) technique, infrared data association (IrDA) technique, ultrawideband (UWB) technique, Bluetooth (BT) technique, and other techniques.

In an exemplary embodiment, the device 1000 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above described methods.

In an exemplary embodiment, there is also provided a non-transitory computer-readable storage medium including instructions, such as the memory 1004 including instructions, the instructions can be executed by the processor 1020 of the device 1000 to implement the above described methods. For example, the non-transitory computer-readable storage medium may be a ROM, a random access memory (RAM), a CD-ROM, a magnetic tape, a floppy disc, and an optical data storage device, etc.

A non-transitory computer-readable storage medium, when the instruction in the storage medium is executed by the processor of the device 1000, enable the device 1000 to perform a method for sending message, the method including: determining whether opposite terminal communication information of an opposite terminal user is acquired; generating a first friend-adding prompt according to the opposite terminal communication information if the opposite terminal communication information is acquired, the first friend-adding prompt may be used to prompt a home terminal user to add the opposite terminal user as a friend; and sending home terminal communication information to the opposite terminal to enable the opposite terminal to generate a second friend-adding prompt according to the local terminal communication information, the second friend-adding prompt may be used to prompt the opposite terminal user to add the local terminal user as a friend.

In one embodiment, the opposite terminal communication information may include at least one of the following information: a communication account of the opposite terminal user, a two-dimensional code identification corresponding to the communication account of the opposite terminal user, a bar code identification corresponding to the communication account of the opposite terminal user.

The local terminal communication information may include at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

In one embodiment, the method may further include initiating a friend-adding request to the opposite terminal according to the first friend-adding prompt; or receiving a friend-adding request sent by the opposite terminal according to the second friend-adding prompt.

In one embodiment, the method may further include establishing a communication connection with the opposite terminal and sending a prompt message that allows communication to the opposite terminal, if a friend confirmation instruction for the friend-adding request is monitored.

In one embodiment, the method may further include generating a friend-adding rejection prompt message and deleting the acquired opposite terminal communication information, if it is monitored that the opposite terminal, according to the second friend-adding prompt, rejects a friend-adding request initiated by the local terminal.

In one embodiment, deleting the acquired opposite terminal communication information may include: determining whether a number of times the opposite terminal rejects a friend-adding request initiated by the local terminal is greater than a preset number of times; deleting the acquired opposite terminal communication information if the number of times is greater than the preset number of times; or generating a delete prompt instruction if the number of times is less than or equal to the preset number of times; deleting the acquired opposite terminal communication information if a delete confirmation instruction for the delete prompt instruction is received.

In one embodiment, the method may further include: judging whether the opposite terminal communication information is reacquired after the acquired opposite terminal communication information is deleted; and intercepting a re-initiated friend-adding request to enable the opposite terminal not to receive the re-initiated friend-adding request, if the opposite terminal communication information is reacquired and a friend-adding request is re-initiated to the opposite terminal.

Other embodiments of the present disclosure will be apparent to those skilled in the art from consideration of the specification and practice of the disclosure disclosed herein. The present disclosure is intended to cover any variations, uses or adaptations of the present disclosure, and these variations, uses and adaptations follow the general principles of the present disclosure and comprise common general knowledge and conventional techniques of the art which are not disclosed herein. The specification and the embodiments are merely considered as exemplary, and the true scope and spirit of the present disclosure are indicated by the following claims.

It should be appreciated that the present disclosure is not limited to the exact structures that have been described above and illustrated in the accompanying drawings, and that various modifications and changes can be made without departing from the scope thereof. It is intended that the scope of the present disclosure is only limited by the appended claims.

What is claimed is:
1. A method for sending message, comprising:
determining whether opposite terminal communication information of an opposite terminal user is acquired;

generating a first friend-adding prompt according to the opposite terminal communication information if the opposite terminal communication information is acquired, the first friend-adding prompt being used to prompt a local terminal user to add the opposite terminal user as a friend;

sending local terminal communication information to the opposite terminal to enable the opposite terminal to generate a second friend-adding prompt according to the local terminal communication information, the second friend-adding prompt being used to prompt the opposite terminal user to add the local terminal user as a friend;

initiating a friend-adding request to the opposite terminal according to the first friend-adding prompt; and generating a friend-adding rejection prompt message, and deleting the acquired opposite terminal communication information, if it is monitored that the opposite terminal, according to the second friend-adding prompt, rejects the friend-adding request initiated by the local terminal;

wherein deleting the acquired opposite terminal communication information comprising:
  determining whether a number of times the opposite terminal rejects the friend-adding request initiated by the local terminal is greater than a preset number of times; and
  deleting the acquired opposite terminal communication information if the number of times is greater than the preset number of times; or wherein deleting the acquired opposite terminal communication information comprising:
  determining whether a number of times the opposite terminal rejects the friend-adding request initiated by the local terminal is greater than a preset number of times;
  generating a delete prompt instruction if the number of times is less than or equal to the preset number of times;
  deleting the acquired opposite terminal communication information if a delete confirmation instruction for the delete prompt instruction is received.

2. The method of claim 1, wherein
the opposite terminal communication information comprises at least one of the following information: a communication account of the opposite terminal user, a two-dimensional code identification corresponding to the communication account of the opposite terminal user, a bar code identification corresponding to the communication account of the opposite terminal user; and
the local terminal communication information comprises at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

3. The method of claim 1, further comprising:
receiving a friend-adding request sent by the opposite terminal according to the second friend-adding prompt.

4. The method of claim 1, further comprising:
establishing a communication connection with the opposite terminal, and sending a prompt message that allows communication to the opposite terminal, if a friend confirmation instruction for the friend-adding request is monitored.

5. The method of claim 1, further comprising:
judging whether the opposite terminal communication information is reacquired after the acquired opposite terminal communication information is deleted; and
intercepting a re-initiated friend-adding request to enable the opposite terminal not to receive the re-initiated friend-adding request, if the opposite terminal communication information is re-acquired and a friend-adding request is re-initiated to the opposite terminal.

6. A device for sending message, comprising:
a processor;
a memory for storing processor-executable instructions;
wherein the processor is configured to:
determine whether opposite terminal communication information of an opposite terminal user is acquired;
generate a first friend-adding prompt according to the opposite terminal communication information if the opposite terminal communication information is acquired, the first friend-adding prompt being used to prompt a local terminal user to add an opposite terminal user as a friend; and
send local terminal communication information to the opposite terminal to enable the opposite terminal to generate a second friend-adding prompt according to the local terminal communication information, the second friend-adding prompt being used to prompt the opposite terminal user to add the local terminal user as a friend;
initiate a friend-adding request to the opposite terminal according to the first friend-adding prompt; and
generate a friend-adding rejection prompt message, and delete the acquired opposite terminal communication information, if it is monitored that the opposite terminal, according to the second friend-adding prompt, rejects the friend-adding request initiated by the local terminal;

wherein the processor is further configured to:
  determine whether a number of times the opposite terminal rejects the friend-adding request initiated by the local terminal is greater than a preset number of times; and
  delete the acquired opposite terminal communication information if the number of times is greater than the preset number of times; or wherein the processor is further configured to:
  determine whether a number of times the opposite terminal rejects the friend-adding request initiated by the local terminal is greater than a preset number of times;
  generate a delete prompt instruction if the number of times is less than or equal to the preset number of times;
  delete the acquired opposite terminal communication information if a delete confirmation instruction for the delete prompt instruction is received.

7. The device of claim 6, wherein the processor is further configured to:
the opposite terminal communication information comprising at least one of the following information: a communication account of the opposite terminal user, a two-dimensional code identification corresponding to the communication account of the opposite terminal user, a bar code identification corresponding to the communication account of the opposite terminal user; and the local terminal communication information comprising at least one of the following information: a communication account of the local terminal user, a two-dimensional code identification corresponding to the communication account of the local terminal user, a bar code identification corresponding to the communication account of the local terminal user, contact information of the local terminal user, a nickname corresponding to the communication account of the local terminal user, a location of the local terminal user, a date of birth of the local terminal user, an age of the local terminal user.

8. The device of claim 6, wherein the processor is further configured to:

receive a friend-adding request sent by the opposite terminal according to the second friend-adding prompt.

9. The device of claim 6, wherein the processor is further configured to:

establish a communication connection with the opposite terminal, and send a prompt message that allows communication to the opposite terminal, if a friend confirmation instruction for the friend-adding request is monitored.

10. The device of claim 6, wherein the processor is further configured to:

judge whether the opposite terminal communication information is reacquired after the acquired opposite terminal communication information is deleted; and intercept a re-initiated friend-adding request to enable the opposite terminal not to receive the re-initiated friend-adding request, if the opposite terminal communication information is re-acquired and a friend-adding request is re-initiated to the opposite terminal.

11. A non-transitory computer-readable storage medium having stored therein instructions that, when executed by a processor of a device, causes the device to perform a method for sending message, the method comprising:

determining whether opposite terminal communication information of an opposite terminal user is acquired;

generating a first friend-adding prompt according to the opposite terminal communication information if the opposite terminal communication information is acquired, the first friend-adding prompt being used to prompt a local terminal user to add the opposite terminal user as a friend; and sending local terminal communication information to the opposite terminal to enable the opposite terminal to generate a second friend-adding prompt according to the local terminal communication information, the second friend-adding prompt being used to prompt the opposite terminal user to add the local terminal user as a friend;

initiating a friend-adding request to the opposite terminal according to the first friend-adding prompt; and generating a friend-adding rejection prompt message, and deleting the acquired opposite terminal communication information, if it is monitored that the opposite terminal, according to the second friend-adding prompt, rejects the friend-adding request initiated by the local terminal;

wherein deleting the acquired opposite terminal communication information comprising:

determining whether a number of times the opposite terminal rejects the friend-adding request initiated by the local terminal is greater than a preset number of times; and deleting the acquired opposite terminal communication information if the number of times is greater than the preset number of times; or wherein deleting the acquired opposite terminal communication information comprising:

determining whether a number of times the opposite terminal rejects the friend-adding request initiated by the local terminal is greater than a preset number of times;

generating a delete prompt instruction if the number of times is less than or equal to the preset number of times;

deleting the acquired opposite terminal communication information if a delete confirmation instruction for the delete prompt instruction is received.

* * * * *